Figure 1:
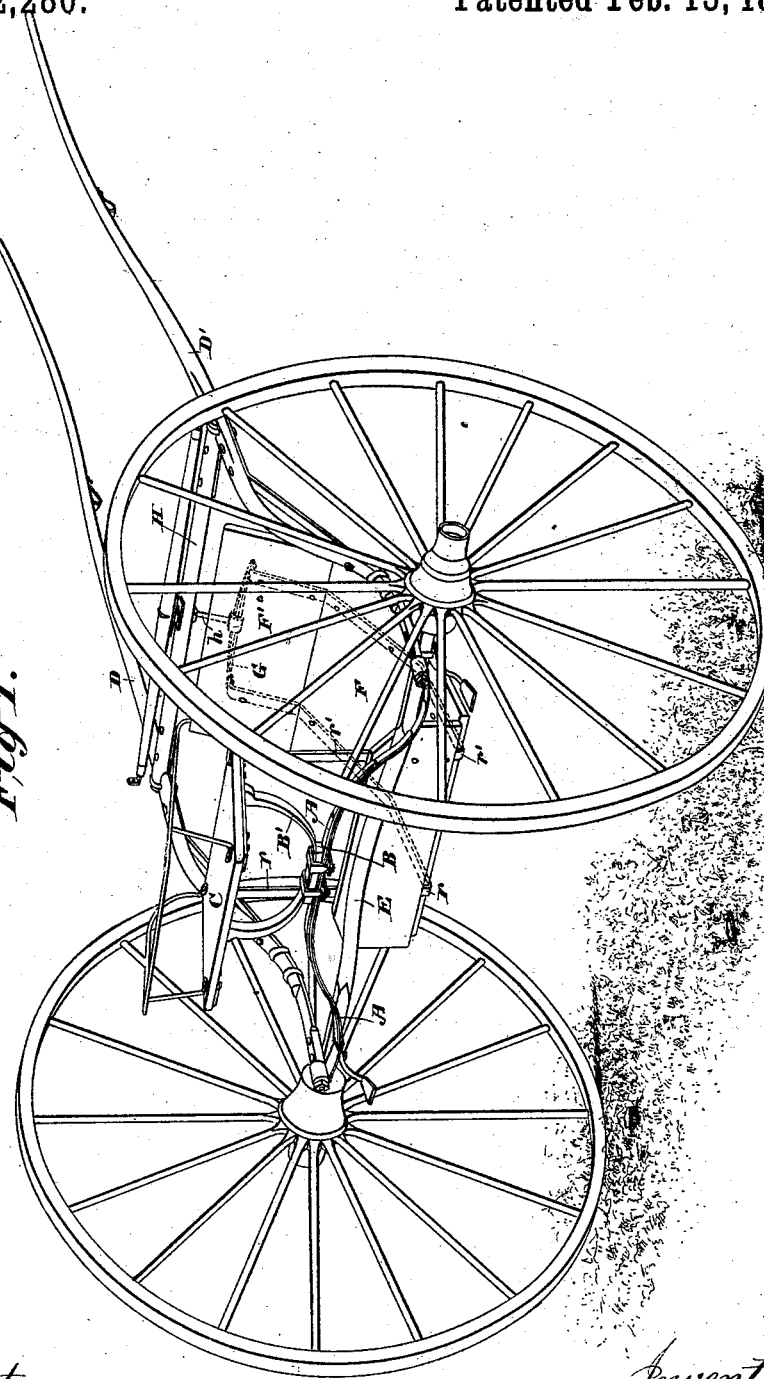

(No Model.) 2 Sheets—Sheet 1.

P. LUGENBELL.
TWO WHEELED VEHICLE.

No. 272,280. Patented Feb. 13, 1883.

Attest
Geo. T. Smallwood Jr.
Herbert Knight

Inventor:
Peter Lugenbell
By Knight Bros
attys (No Model.) 2 Sheets—Sheet 2.
P. LUGENBELL.
TWO WHEELED VEHICLE.
No. 272,280. Patented Feb. 13, 1883.
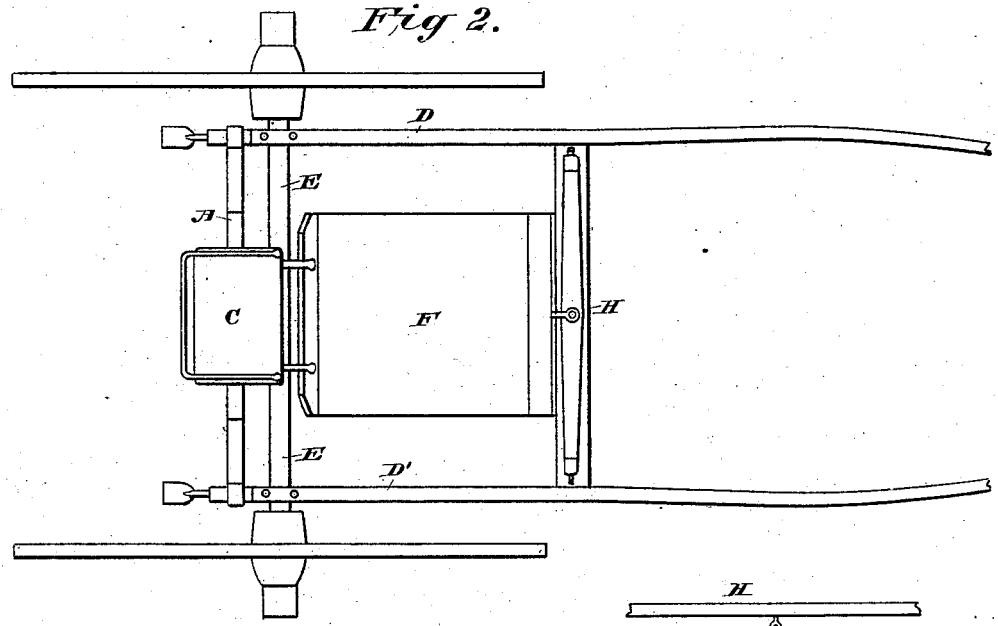
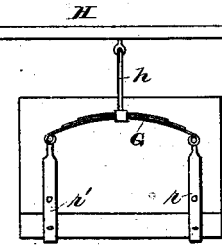
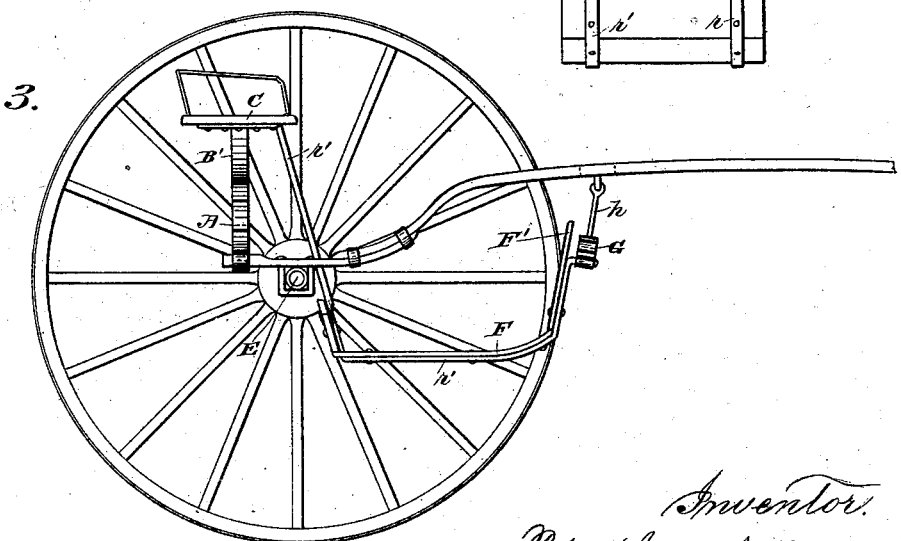
Attest.
Geo. T. Smallwood Jr.
Herbert Knight
Inventor.
Peter Lugenbell.
By Knight Bros
attys.

United States Patent Office.

PETER LUGENBELL, OF GREENSBURG, INDIANA, ASSIGNOR OF ONE-HALF TO JOSEPH POOL AND ABRAHAM REITER, BOTH OF SAME PLACE.

TWO-WHEELED VEHICLE.

SPECIFICATION forming part of Letters Patent No. 272,280, dated February 13, 1883.

Application filed October 23, 1882. (No model.)

*To all whom it may concern:*

Be it known that I, PETER LUGENBELL, of Greensburg, in the county of Decatur and State of Indiana, have invented certain new and useful Improvements in Two-Wheeled Vehicles; and I do hereby declare the following to be a full, clear, and exact description of the invention, such as will enable others skilled in the art to which it appertains to make and use the same, reference being had to the accompanying drawings, which form a part of this specification, in which—

Figure 1 is a perspective view of my improved vehicle. Fig. 2 is a plan of the same. Fig. 3 is a side view, the right wheel being removed. Fig. 4 is a detail view illustrating the mode of supporting the forward part or front of the foot-board.

My invention relates to an improved mode of attaching the spring, running parallel to the axle of a vehicle, to the shafts or arms of the pole, the said shafts or arms extending to the rear of the axle, thereby forming means for securing the spring above referred to, and to the mode of attaching the dash-board or foot-board to the cross-bar of the shafts.

The object of my invention is to provide in a sulky, cart, or other two-wheeled vehicle a more convenient and a simpler arrangement of the spring, shafts, axle, and foot-board, and attaching them in such a way as to add to the strength of the vehicle, improving thereby upon their present mode of construction.

In the drawings, A represents the spring, supporting, by means of block B and circle-piece B', the seat C, and bearing upon the rear ends of the shafts D D', the said ends being made of iron and rounded to receive the ends of the spring, the latter being bent and wound around the shaft-irons.

The axle E, running parallel with the springs A, has attached to it the shafts D D', by means of bolts, somewhat in advance of the spring.

The foot-board F and dash-board F' are attached to and arranged upon rods $r\ r'$, secured at one end to the seat C and at the other end to the spring G, the said spring being fastened by bar, link, or rod $h$ to the clip or bolt of the cross-bar H of the shafts.

By the above-described construction of the spring A, the shafts D D', the axle E, the rods $r\ r'$, and the spring G, with the seat C, I produce a neat and simple vehicle, possessing the double advantage of durability and convenience.

My vehicle may be a sulky; or it may be constructed to accommodate two persons.

Having thus described my invention, what I claim as new, and desire to secure by Letters Patent, is—

1. In a sulky, the combination of shafts D D', extending beyond the axle, spring A, secured to the rear ends of the shafts, circle-piece B', mounted on said spring, and a seat supported by said circle-piece, as set forth.

2. The combination of rods $r\ r'$, supporting the foot and dash boards, the spring G, connecting the forward ends of the rods, cross-bar securing the shafts together, and coupling-rod $h$, depending from the center of the cross-bar, as set forth.

3. The combination of axle E, shafts D D', spring A, circle-piece B', seat C, rods $r\ r'$, spring G, connecting said rods, coupling-rod $h$, and cross-bar H, as set forth.

PETER LUGENBELL.

Witnesses:
DAN. M. HENRY,
JAMES MCCONNELL.